United States Patent [19]

Kanamori et al.

[11] 4,427,403
[45] Jan. 24, 1984

[54] TOOTHED BELT POWER TRANSMISSION DEVICE

[75] Inventors: Katsuo Kanamori, Kobe; Hiroyuki Okawa, Amagasaki; Takahide Mizuno; Fumihito Nakagawa, both of Kobe; Isamu Nagai, Kyoto, all of Japan

[73] Assignees: Mitsubishi Jidosha Kogyo Kabushiki Kaisha, Tokyo; Mitsuboshi Belting Ltd., Kobe, both of Japan

[21] Appl. No.: 298,142

[22] Filed: Aug. 31, 1981

[30] Foreign Application Priority Data

Sep. 3, 1980 [JP] Japan .............................. 55-122685

[51] Int. Cl.³ ........................... F16H 7/02; F16G 1/28
[52] U.S. Cl. .................................. 474/153; 474/205; 474/250
[58] Field of Search ................. 474/153, 205, 250, 251

[56] References Cited

U.S. PATENT DOCUMENTS

| 2,507,852 | 5/1950 | Case | 474/205 |
| 2,934,967 | 5/1960 | Worrall, Jr. | 474/153 |
| 3,002,396 | 10/1961 | Worrall, Jr. | 474/153 |
| 3,404,576 | 10/1968 | Cigognani | 474/153 |
| 3,756,091 | 9/1973 | Miller | 474/205 |
| 4,037,485 | 7/1977 | Hoback | 474/153 |
| 4,041,789 | 8/1977 | Hoback | 474/153 |
| 4,148,225 | 4/1979 | Redmond, Jr. et al. | 474/153 |
| 4,233,852 | 11/1980 | Bruns | 474/205 |
| 4,337,056 | 6/1982 | Bruns | 474/205 |

FOREIGN PATENT DOCUMENTS

| 568864 | 7/1958 | Belgium | 474/153 |
| 775476 | 2/1978 | U.S.S.R. | 474/205 |

Primary Examiner—Alfred C. Perham
Assistant Examiner—Andrew J. Rudy
Attorney, Agent, or Firm—Sughrue, Mion, Zinn, Macpeak and Seas

[57] ABSTRACT

A belt tooth is provided with an arcuate surface at its tip for engaging and compressing against the bottom surface of a pulley groove to decrease noise and vibration in a toothed belt power transmission system.

12 Claims, 4 Drawing Figures

TOOTHED BELT POWER TRANSMISSION DEVICE

BACKGROUND OF THE INVENTION

This invention relates to a toothed belt power transmission device comprising a combination of a toothed belt and a pulley. More particularly, it is concerned with a combination, in a predetermined dimensional relationship, of a pulley having a groove and a tooth which are trapezoidal in cross section, and a toothed belt having a tooth defined by a combination of straight lines and arcs.

A toothed belt enables slipless, positive driving, as opposed to a flat or V belt. It also has a number of advantages over a gear and a chain. For example, it does not require any lubrication. For these reasons, the use of toothed belts has recently sharply increased.

The transmission of power from a toothed belt is accomplished by engagement of its tooth with the grooves of a pulley. The belt is likely to make an abnormal noise when engaging or disengaging the pulley, depending, for example, on the tooth shape or the engaged relationship between the belt and the pulley. Moreover, it is likely that the belt may have a worn groove surface, or a damaged tooth.

There is known a power transmission system which comprises a belt having teeth of trapezoidal cross section, and a pulley having a contour which is complementary to the teeth on the belt, and engageable therewith, as specified, for example, by RMA (Rubber Manufactures Association) Ip-24 (1978). The driven slant surfaces of the grooves in the belt are adapted to intimately contact associated drive slant surface of the teeth on the pulley, while there is a clearance space between the crest of the tooth on the belt and the bottom of the groove in the pulley. The belt groove is hard, since it has an external canvas layer and a hard body of high tensile strength positioned adjacent thereto. The tooth on the pulley is also made of a hard material, such as metal or resin. Therefore, the engagement between the belt groove and the pulley tooth causes vibration of the belt. The frequency f of this vibration is usually expressed by the following equation:

$$f = \frac{\text{Number of teeth on the pulley} \times \text{Rotating speed of the pulley}}{60}$$

Resonance occurs and an abnormal sound is generated in the event that a driving shaft, a driven shaft, an idler shaft, or any other element surrounding the pulley has a natural frequency f' which is equal to nf or f/n (n is natural number). When this device is employed in an automobile, or like engine, it is particularly true that resonance and unpleasant noise often occur in some position of the widely variable rotating speed of the engine.

Besides the noise caused by vibration, when such hard substances strike against each other there occurs a noise having a relatively high frequency. A belt groove is very likely to a pulley tooth with a resultant shear of a belt tooth.

In order to improve these disadvantages, there has been developed a driving system in which a belt tooth has a height greater than the depth of a pulley groove, and is adapted to be compressively engaged therein, as disclosed in U.S. Pat. No. 4,037,485. According to this system, a belt tooth is compressively deformable in a pulley groove to decrease in height, whereby the wear of a belt groove contacting a pulley tooth is prevented. A belt tooth is designed to be substantially complementary to a pulley groove and contacts the whole surface thereof, the drive/driven slant surfaces of a belt tooth contacting the corresponding driven/drive slant surfaces of a pulley groove over a maximum surface area possible so that a low contact pressure may be maintained therebetween to reduce tooth deformation. Accordingly, a belt tooth has only a limited degree of freedom for compressive deformation in a pulley groove. Such a belt tooth fails to provide a satisfactory function of absorbing impact, and there inevitably occurs an undesirable noise when a belt tooth engages a pulley groove.

In view of these problems, it is an object of this invention to improve the shape of a tooth on a belt and the dimensional relationship between the belt and a pulley in their statically engaged position, and provide an improved toothed belt power transimmion device which (1) generates less noise upon engagement between a belt groove and a pulley tooth, and between a belt tooth and a pulley groove, (2) prevents any abnormal sound from arising due to vibration upon engagement between a belt groove and a pulley tooth, (3) protects the surface of a belt groove against wear during the transmission of power at high loads, and (4) ensures a prolonged belt life.

SUMMARY OF THE INVENTION

According to this invention, the aforesaid object is attained by a toothed belt power transmission device comprising a toothed belt of rubber, or any other elastic material or a synthetic resin, having teeth and grooves formed alternately at a fixed pitch along its length, each tooth having a first region which occupies 60 to 95% of its height Hb, and a second region defining the remaining portion of the tooth at the crest thereof, the first region being defined by flat surfaces having a predetermined angle $\theta$ of inclination of the centerline of the teeth, the second region or at least the crest of the tooth being defined by an arc having its center on the centerline of the tooth, and a toothed pulley having grooves and teeth which are substantially trapezoidal in cross section, each groove of the pulley having a depth Hp selected to maintain such a dimensional relationship to the height Hb of each tooth on the belt that $$\frac{Hb - Hp}{Hb}$$

may be from 0 to 0.15, whereby the crests of the teeth on the belt are brought into contact with the root surfaces of the grooves in the pulley when the belt and the pulley are engaged with each other.

BRIEF DESCRIPTION OF THE DRAWINGS

The invention will now be described more specifically by way of example with reference to the drawings in which.

DESCRIPTION OF THE PREFERRED EMBODIMENTS

Figure 1:
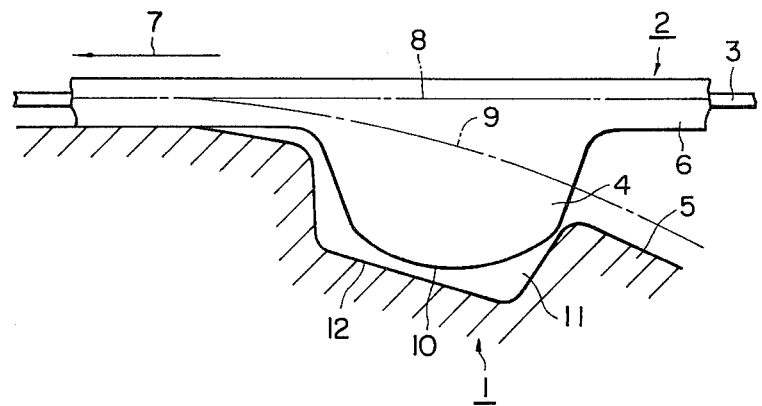
FIG. 1 is fragmentary side elevational view of a toothed belt power transmission device embodying this invention, in which a toothed belt is shown in the process of engaging with a pulley.

Referring first to FIG. 1, there is fragmentarily shown in side elevation a toothed belt 2 engaging a toothed pulley 1. The belt 2 is mainly made of rubber or any other elastic material, or a synthetic resin, and incorporates a core 3 of high tensile strength. The belt 2 includes a tooth 4 which is engageable with a groove 11 in the pulley 1. The pulley 1 includes a tooth 5 which is engageable with a groove 6 in the belt 2. The belt 2 engages the pulley 1 when travelling in the direction of arrow 7. The core 3 of the belt 2 has a centerline which defines a pitchline 8 for the belt 2. When the pitch line 8 coincides with a pitchline 9 for the pulley 1, the belt 2 is smoothly engageable with the pulley 1. The tooth 4 of the belt 2 has a crest 10 which is only partially engageable with the bottom surface 12 of the groove 11 in the pulley 1, while the greater part of the crest 10 defines a free surface. The tooth 4 of the belt 2 is compressively deformable to mitigate effectively the contact pressure between the tooth 5 on the pulley 1 and the groove 6 in the belt 2, so that the belt 2 may maintain its engagement with the pulley 1 without making any loud noise or abnormal sound.

Figure 2:
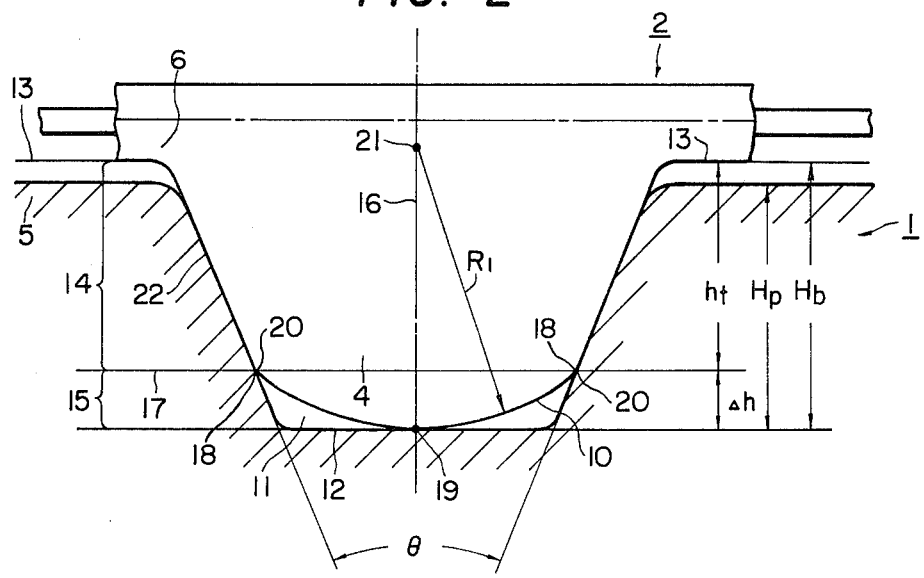
FIG. 2 is a fragmentary side elevational view of the device in which the toothed belt is in a statically engaged position with the pulley.

Referring to FIG. 2, the toothed belt 2 rests in its engaged position with the pulley 1. Only one tooth 4 is shown for the belt 2, though it has a plurality of teeth and grooves alternately at a certain pitch along its length. The tooth 4 has a contour defined by a combination of flat and arcuate surfaces, as shown in FIG. 2. The flat surfaces extend from the surface 13 of the toothed groove in the belt, and define a first region 14 occupying 60 to 95% of the height Hb of the tooth 4 as indicated at ht. The flat surfaces are inclined to define an angle $\theta$ of 40° to 50° therebetween. This range of the angle of inclination is desirable to ensure proper engagement of the tooth 4 with the groove 11. Any height of the first region 14 that is smaller than 60% of the overall tooth height Hb is undesirable, since it reduces the flat surfaces, and hinders the transmission function of the belt.

The crest of the tooth 4 is formed in a second region 15 by an arcuate surface 10. It has a center 21 on the centerline 16 of the tooth 4, and its radius is indicated at $R_1$. This is in contrast to a known belt in which the crest is formed by a surface 17 lying in prarallel to the groove surface 13 as shown in the boundary between the first and second regions 14 and 15. Accordingly, the tooth of the toothed belt according to this invention has a contour defined by adding an arcuate portion to the known trapezoidal configuration. The height Hb of the tooth 4 is, thus, equal to the height ht of the known trapezoidal tooth, plus the height $\Delta h$ of the arcuate portion. The boundaries 18 between the first and second regions 14 and 15 are defined by arcuate segments of appropriately small radius.

The arc defining the second region 15 passes through a point 19 located on the centerline 16 of the tooth 14, and having a distance of Hb from the groove surface 13, and a pair of points 20 located on the arcs defining the boundary areas 18.

Figure 3:
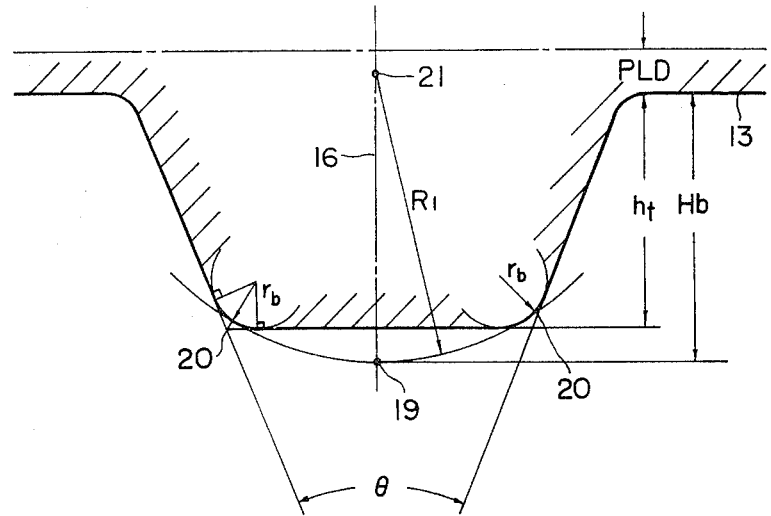
FIG. 3 is a detailed view for the design of a tooth on the toothed belt according to this invention.

FIG. 3 shows by way of example the design for the tooth on the toothed belt 2. Slanting lines define the contour of a known belt having a trapezoidal tooth. The tooth height ht, the angle $\theta$ of its slant surfaces, the radius $r_b$ of the arcs defining the boundaries between the slant surfaces and crest of the tooth, and the PLD value (i.e., the distance between the centerline of the core of the belt, and its groove surface 13) are all specified by RMA, etc.

According to this invention, the height Hb of a tooth on a toothed belt is obtained from the equation $$\frac{Hb - Hp}{Hb} = 0 \text{ to } 0.15$$

which will hereinafter be explained in further detail, whereby the points 19, 20 and 20' are determined. The point 19 is located on the centerline 16 of the tooth and apart from the groove surface 13 by a distance of Hb. The points 20 and 20' are located on the arcs $r_b$, and divide them into two equal portions. The three points 19, 20 and 20' define an arc having a radius $R_1$ with its center 21 located on the tooth centerline 16.

The grooves and teeth of the pulley 1, with which the belt engages, have a trapezoidal cross section defined by flat surfaces, as is the case with any known pulley. This invention is not limited to pulleys having flat slant surfaces, but it is also possible to employ a known pulley having trapezoidal grooves and teeth in which each groove 11 has involute slant surfaces 22, and a flat bottom surface 12.

This invention thus provides an economical power transmission system which does not require any special pulley tooth configuration, but in which a known pulley can be employed for the toothed belt having a specific tooth configuration as hereinabove described.

Another salient feature of this invention resides in the aforesaid dimensional relationship between the toothed belt and the pulley. When the belt is designed, it is essential to ensure that the height Hb of each tooth on the belt be equal to, or greater than the depth Hp of each groove in the pulley to the extent that the following equation is satisfied:

$$\frac{Hb - Hp}{Hb} = 0 \text{ to } 0.15$$

While it is out of the question from the standpoint of manufacturing to select a value of Hb which is smaller than Hp, it is also undesirable to choose the value of $$\frac{Hb - Hp}{Hb}$$

which is greater than 0.15, since the belt is likely to jump or skip from its proper engagement with the pulley. Theoretical and experimental considerations verify the propriety of the aforesaid dimensional relationship.

If the toothed belt configuration and the dimensional relationship between the belt and the pulley as hereinabove set forth are employed, the toothed belt does not cause any vibration, or any abnormal sound or noise when it engages any pulley having dimensions specified by RMS, etc. The soft tooth, which is composed of canvas and rubber or other elastic material, functions as an antivibratory rubber element when its crest strikes against the bottom of the groove in the pulley. The arcuately formed crest of the tooth is smoothly engageable with the pulley groove in a rolling fashion. There is no interference between the groove in the belt and the tooth on the pulley, since their contact pressure is reduced, and the groove in the belt is protected against damage since no heavy contact pressure acts thereon.

If desired, it is possible to provide a backlash between the flanks of the tooth 4 on the belt, and the flanks 22 of the groove 11 in the pulley.

During the initial period of engagement between the belt and the pulley, only a part of the crest of the tooth on the belt engages the bottom of the groove in the pulley, and thereafter, the greater part of the arcuate portion of the tooth is compressively deformable in the groove of the pulley without being substantially restricted by its slant surfaces. Thus, the soft tooth of the belt fully exhibits its shock absorbing function to reduce any noise generated when the crest of the tooth on the belt engages the bottom of the groove in the pulley. If the tooth on the belt is exactly complementary to the groove in the pulley, the noise reduction cannot be achieved, since the whole surface of the tooth contacts the pulley, and its compressive deformability is restricted by the slant surfaces of the groove in the pulley. Accordingly, it is one of the important features of this invention to ensure that upon initial contact only a part of the crest of the tooth on the belt be brought into contact with the bottom of the groove in the pulley.

Figure 4:
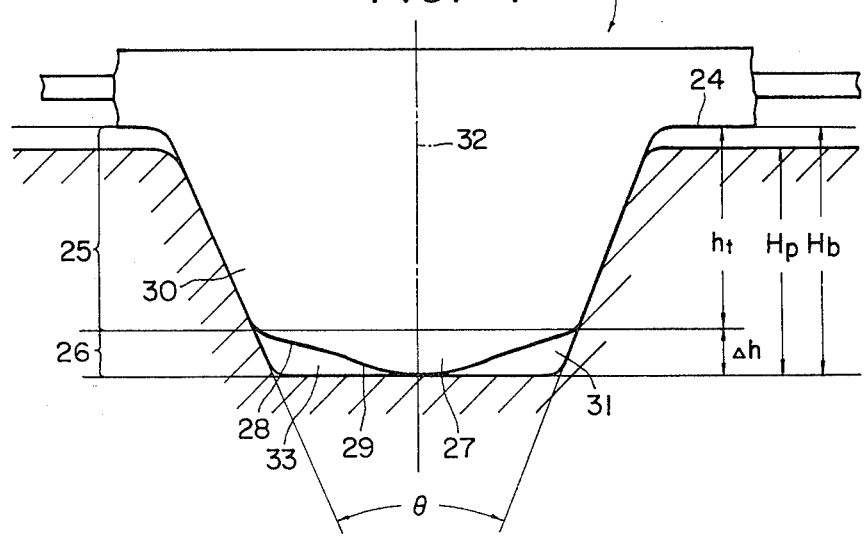
FIG. 4 is a fragmentary view of a power transmission device according to another embodiment of this invention.

Referring now to FIG. 4, there is shown a different embodiment of the device according to this invention. A toothed belt 23 has a tooth configuration defined by flat surfaces in a first region 25 extending from a groove surface 24, and occupying 60 to 95% (ht) of the height Hb of a tooth 30, and two arcs 28 and 29 in a second region 26 terminating in a crest 27. The arcs 28 and 29 have their centers on the centerline 32 of the tooth 30.

The arc 29 in the second region 26 clearly defines the crest 27 of the tooth 30. The second region 26 defined by the two arcs 28 and 29 has a cross sectional area which is smaller than the second region 15 shown in FIG. 2 as being defined by a single arc. This arrangement provides a greater clearance space 31 between the belt and the pulley when the crest 27 of the tooth on the belt has engaged the bottom of the pulley groove. Thus, less noise is generated when the tooth 30 on the belt has engaged the groove 33 in the pulley.

According to this invention, it is possible to prevent any noise from being generated by impact between the belt tooth and the pulley groove during their engagement by causing the tooth to be deformed upon contact with the bottom of the pulley groove to thereby absorb any impact energy therebetween. This absorption of impact energy also prevents generation of any noise caused by impact between the groove in the belt and the tooth on the pulley.

The following examples illustrate the invention in more detail.

EXAMPLE 1

Toothed belts were tested for power transmission between a crankshaft and an oil pump shaft in a 2,000 cc gasoline engine at a natural frequency f' of 300 Hz. First there was employed a known belt having teeth which were trapezoidal in cross section. The principal dimensions of the belt were as follows:
Pitch: 9.525 mm
Number of teeth: 122
Belt width: 19 mm
Tooth height ht: 2.29 mm
Arc radius $r_b$: 1.02 mm
Tooth angle $\theta$: 40°
PLD: 0.686 mm The belt was passed around the crankshaft, a crank pulley having teeth and grooves of trapezoidal cross section defined by flat surfaces and mounted on the oil pump shaft, and an oil pump pulley. The crank pulley had 24 teeth, a groove depth Hp of 2.59 mm, and a tooth angle $\theta$ of 40°. The oil pump pulley had 18 teeth, a groove depth Hp of 2.59 mm, and a tooth angle $\theta$ of 40°. The belt caused resonance, when the crank pulley was rotated at a low speed of 600 to 900 rpm, and generated an abnormal noise at a frequency f of 240 to 360 Hz.

Next, there was employed a toothed belt of this invention as shown in FIG. 3. The principal dimensions of the belt were as follows:
Pitch: 9.525 mm
Number of teeth: 122
Belt width: 19 mm
Tooth height Hb: 2.75 m
Arc radius $R_1$: 3.55 mm
Arc radius $r_b$: 1.02 mm
Tooth angle $\theta$: 40°
PLD: 0.686 mm No noticeable vibration or noise was generated between the grooves in the belt and the teeth on the pulley in any operating range of the crank pulley.

EXAMPLE 2

A known belt, and a belt of this invention, which were both of the type employed in Example 1, were each passed around a driving pulley having teeth and grooves of trapezoidal cross section defined by flat surfaces, and two driven pulleys. The driving pulley had 32 teeth, a tooth height Hp of 2.59 mm, and a tooth angle $\theta$ of 40°. Each of the driven pulleys had 16 teeth, a tooth height Hp of 2.59 mm, and a tooth angle $\theta$ of 40°. A power transmission system having a tension pulley provided between the driven pulluys was tested for noise, and belt life. The results are shown in the following table. The belt was driven at an ambient temperature of 100° C. The driving pulley was rotated at a speed of 3,000 rpm. The belt had a load of 8.1 ps. The value of $$\frac{Hb - Hp}{Hb}$$

was 0.05.

|  | Noise (dB) | Belt life (hours) |
| --- | --- | --- |
| Known transmission system | 95 | 170 |
| Transmission system of this invention | 89 | 495 |

As is obvious from the foregoing description, the power transmission system of this invention comprises a combination of a toothed belt having a tooth configuration defined by flat and arcuate surfaces with a known pulley having grooves and teeth which are trapezoidal in cross section. Each tooth on the belt is compressively deformable in one of the grooves in the pulley, as its crest contacts the bottom of the groove. Thus, the teeth on the belt effectively absorb any impact between the teeth on the belt and the grooves in the pulley, and reduce the noise generated by any such impact. The arcuate crest of each tooth on the belt is smoothly engageable with the pulley groove in a rolling fashion to absorb any impact energy developed therebetween, whereby any abnormal sound or noise can be prevented from arising between the grooves can be protected against damage. A prolonged belt life is another advantage of this invention. The power transmission system of this invention is, therefore, useful for a wide range of practical applications, including power transmission in an automobile engine.

What is claimed is:

1. A toothed belt power transmission device comprising a toothed belt comprised of elastic material and having alternating grooves and teeth at a predetermined pitch in the longitudinal direction of said belt with each belt groove having a bottom surface and each belt tooth being symmetrical about a tooth center line and comprised of a first base region and a second top region and having a total height $H_b$ measured from said belt groove bottom surface, said first base region of each tooth extending from said belt groove bottom surface with a height $h_t$ which is between substantially 60 to 95 percent of said total height $H_b$, said first base region being defined by flat slant surfaces having a constant tooth angle $\theta$ therebetween, said second top region of each tooth being comprised of at least a subregion defined by an arcuate surface having a center curvature located on said tooth center line and a pulley having alternating teeth and grooves thereon with each tooth of said pulley having a trapezoidal cross-section defined by substantially linear surfaces and with each groove of said pulley having a bottom surface at a depth $H_p$ such that the dimensional relation between said pulley groove and said belt tooth is such that the total height of each belt tooth is equal to or greater than said depth $H_p$ of each groove of said pulley so that upon mating engagement between said belt and said pulley, only said subregion of said belt tooth is pressingly deformed against the bottom surface of said pulley groove.

2. A device according to claim 1 wherein said height $H_b$ and said depth $H_p$ have a dimensional relationship represented by the equation:

$$\frac{H_b - H_p}{H_b} \leq 0.15.$$

3. A device according to claim 1 wherein said arcuate surface is defined by a single arc extending between said flat slant surfaces.

4. A device according to claim 1 wherein each tooth of said pulley is defined on either side by flat slant surfaces having a constant tooth angle therebetween equal to said tooth angle $\theta$ of said belt.

5. A device according to claim 4 wherein said tooth angle $\theta$ is in the range of 40 to 50 degrees.

6. A device according to claim 1 wherein said arcuate surface comprises a plurality of portions of different curvature, each having a center of curvature located on said belt tooth center line.

7. A toothed belt power transmission device comprising a toothed belt comprised of elastic material and having alternating grooves and teeth at a pre-determined pitch in the longitudinal direction of said belt with each belt groove having a bottom surface and each belt tooth being symmetrical about a tooth center line and comprised of a first base region and a second top region and having a total height $H_b$ measuring from said belt groove bottom surface, said first base region of each tooth extending from said belt groove bottom surface with a height $h_t$ which is between substantially 60 to 95 percent of said total height $H_b$, said first base region being defined by slant flat surfaces having a constant tooth angle $\theta$ therebetween, said second top region of each tooth being comprised of at least a subregion defined by an arcuate surface having a center of curvature located on said tooth center line and a pulley having alternating teeth and grooves thereon with each tooth of said pulley having involutely curved slant surfaces with each groove of each pulley having a bottom surface at a depth $H_p$ such that the dimensional relation between said pulley groove and said belt tooth is such that the total height of each belt tooth is equal to or greater than said depth $H_p$ of each groove of said pulley so that upon mating engagement between said belt and said pulley, only said subregion of said belt tooth is pressingly deformed against the bottom surface of said pulley groove.

8. A device according to claim 7 wherein said height $H_b$ and said depth $H_p$ have a dimensional relationship represented by the equation:

$$\frac{H_b - H_p}{H_b} \leq 0.15.$$

9. A device according to claim 7 wherein said arcuate surface is defined by a single arc extending between said flat slant surfaces.

10. A device according to claim 7 wherein each tooth of said pulley is defined on either side by flat slant surfaces having a constant tooth angle therebetween equal to said tooth angle $\theta$ of said belt.

11. A device according to claim 10 wherein said tooth angle $\theta$ is in the range of 40 to 50 degrees.

12. A device according to claim 7 wherein said arcuate surface comprises a plurality of portions of different curvature, each having a center of curvature located on said belt tooth center line.

* * * * *